(12) United States Patent
Koshiji et al.

(10) Patent No.: US 7,272,497 B2
(45) Date of Patent: Sep. 18, 2007

(54) VEHICLE NAVIGATION SYSTEM WITH MULTI-USE DISPLAY

(75) Inventors: Yoshikazu Koshiji, Ann Arbor, MI (US); Yoichi Hori, Ann Arbor, MI (US)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 376 days.

(21) Appl. No.: 10/800,667

(22) Filed: Mar. 16, 2004

(65) Prior Publication Data

US 2004/0193371 A1 Sep. 30, 2004

Related U.S. Application Data

(60) Provisional application No. 60/456,564, filed on Mar. 24, 2003.

(51) Int. Cl.
G01C 21/30 (2006.01)
H04L 29/06 (2006.01)

(52) U.S. Cl. .................. 701/211; 701/212; 701/213; 307/116

(58) Field of Classification Search ................ 701/200, 701/211–213; 342/357.06, 357.13; 340/990, 340/995.26; 307/116
See application file for complete search history.

(56) References Cited

U.S. PATENT DOCUMENTS 3,769,710 A * 11/1973 Reister ......................... 33/320

(Continued)

FOREIGN PATENT DOCUMENTS

EP 59120 B * 10/1985

(Continued)

OTHER PUBLICATIONS

The mobile transportation information service system: Yonghua Zhou; Huapu Lu; Systems, Man and Cybernetics, 2005 IEEE International Conference on vol. 3, Oct. 10-12, 2005 pp. 2218-2223 vol. 3 ; Digital Object Identifier 10.1109/ICSMC.2005.1571478.*
Land-vehicle navigation using GPS; Abbott, E.; Powell, D.; Proceedings of the IEEE; vol. 87, Issue 1, Jan. 1999 pp. 145-162; Digital Object Identifier 10.1109/5.736347.*
A visual navigation system for autonomous land vehicles; Waxman, A.; LeMoigne, J.; Davis, L.; Srinivasan, B.; Kushner, T.; Eli Liang; Siddalingaiah, T.; Robotics and Automation, IEEE Journal of [legacy, pre—1988], vol. 3, Issue 2, Apr. 1987 pp. 124-141.*

(Continued)

Primary Examiner—Cuong Nguyen
(74) Attorney, Agent, or Firm—Smith, Gambrell & Russell LLP (57) ABSTRACT

A vehicle navigation system (e.g., GPS) with multi-use display generator that provides for the switching of a displayed image from a navigational based image to a non-navigational image such as a favorite photo. This versatility allows for the user of a vehicle navigation to avoid having to look at a boring display of map images and instead view more desirable non-navigation images such as full 100% displays of a favorite photo shot. Also if the system is in a map image mode and the user does not utilize any portion of the vehicle navigation system for a predetermined period of time an automated switchover system is provided to cause a predetermined or randomly chosen favorite photo to appear on the display. An addition option of the system is to provide an automatic switchover to the favorite display mode whenever a determination is made by the system that it will not be needed for a long period such as when the user is on a long country road or when the destination is inputted and there are no options that will arise for an extended period. Various display modes are also featured that enable greater non-navigation display mode options and activation choices.

21 Claims, 9 Drawing Sheets

U.S. PATENT DOCUMENTS

| | | | |
|---|---|---|---|
| 3,953,669 A * | 4/1976 | Saccomani et al. | 348/170 |
| 4,138,726 A * | 2/1979 | Girault et al. | 345/638 |
| 4,221,975 A * | 9/1980 | Ledniczki et al. | 307/116 |
| 4,299,462 A * | 11/1981 | Suzuki et al. | 396/279 |
| 4,363,108 A * | 12/1982 | Lange et al. | 345/467 |
| 4,376,575 A * | 3/1983 | Someya et al. | 396/281 |
| 4,663,630 A * | 5/1987 | Numaho et al. | 342/176 |
| 4,707,126 A * | 11/1987 | Ohshima et al. | 399/14 |
| 4,814,989 A * | 3/1989 | Dobereiner et al. | 701/210 |
| 4,989,090 A * | 1/1991 | Campbell et al. | 348/451 |
| 5,170,427 A * | 12/1992 | Guichard et al. | 348/14.05 |
| 5,173,777 A * | 12/1992 | Dangschat | 348/705 |
| 5,339,392 A * | 8/1994 | Risberg et al. | 715/762 |
| 5,410,480 A | 4/1995 | Koseki et al. | |
| 5,528,248 A * | 6/1996 | Steiner et al. | 342/357.06 |
| 5,563,786 A | 10/1996 | Torii | |
| 5,774,828 A * | 6/1998 | Brunts et al. | 701/210 |
| 5,815,135 A * | 9/1998 | Yui et al. | 345/97 |
| 5,847,688 A * | 12/1998 | Ohi et al. | 345/98 |
| 5,864,125 A | 1/1999 | Szabo | |
| 5,898,392 A * | 4/1999 | Bambini et al. | 340/996 |
| 5,938,704 A | 8/1999 | Torii | |
| 5,991,690 A * | 11/1999 | Murphy | 701/211 |
| 6,009,363 A | 12/1999 | Beckert et al. | |
| 6,028,537 A * | 2/2000 | Suman et al. | 340/988 |
| 6,055,560 A * | 4/2000 | Mills et al. | 709/200 |
| 6,163,749 A * | 12/2000 | McDonough et al. | 701/208 |
| 6,185,484 B1 | 2/2001 | Rhinehart | |
| 6,199,015 B1 | 3/2001 | Curtwright et al. | |
| 6,223,124 B1 | 4/2001 | Matsuno et al. | |
| 6,239,081 B1 | 5/2001 | Korzilius et al. | |
| 6,252,544 B1 * | 6/2001 | Hoffberg | 342/357.1 |
| 6,272,405 B1 | 8/2001 | Kubota | |
| 6,340,959 B1 * | 1/2002 | Inamori | 345/3.1 |
| 6,392,591 B1 | 5/2002 | Hsu et al. | |
| 6,429,812 B1 * | 8/2002 | Hoffberg | 342/357.1 |
| 6,436,049 B1 * | 8/2002 | Kamiyama et al. | 600/458 |
| 6,515,595 B1 | 2/2003 | Obradovich et al. | |
| 6,526,335 B1 | 2/2003 | Treyz et al. | |
| 6,542,793 B2 * | 4/2003 | Kojima et al. | 701/1 |
| 6,611,755 B1 * | 8/2003 | Coffee et al. | 701/213 |
| 6,673,019 B2 * | 1/2004 | Kamiyama | 600/443 |
| 6,711,475 B2 * | 3/2004 | Murphy | 701/3 |
| 6,940,646 B2 * | 9/2005 | Taniguchi et al. | 359/463 |
| 6,943,955 B2 * | 9/2005 | Kaschke et al. | 359/630 |
| 6,969,183 B2 * | 11/2005 | Okubo et al. | 362/466 |
| 2002/0087401 A1 | 7/2002 | Leampan et al. | |
| 2002/0198633 A1 * | 12/2002 | Weimper | 701/1 |
| 2003/0001816 A1 * | 1/2003 | Badarneh | 345/156 |
| 2003/0100965 A1 * | 5/2003 | Sitrick et al. | 700/83 |
| 2004/0009813 A1 * | 1/2004 | Wind | 463/30 |
| 2004/0193371 A1 * | 9/2004 | Koshiji et al. | 701/211 |
| 2005/0137765 A1 * | 6/2005 | Hein et al. | 701/36 |

FOREIGN PATENT DOCUMENTS

| | | | | |
|---|---|---|---|---|
| JP | 05010775 A | * | 1/1993 | |
| JP | 2000261731 A | * | 9/2000 | |
| JP | 2000267564 A | * | 9/2000 | |
| JP | 2001041753 A | * | 2/2001 | |
| JP | 2001-127047 | * | 4/2001 | |
| JP | 2003044015 A | * | 2/2003 | |
| JP | 3765347 B2 | * | 4/2006 | |

OTHER PUBLICATIONS

Vision for mobile robot navigation: a survey; Desouza, G.N.; Kak, A.C.; Pattern Analysis and Machine Intelligence, IEEE Transactions on; vol. 24, Issue 2, Feb. 2002 pp. 237-267; Digital Object Identifier 10.1109/34.982903.*

A gps-based range tracking unit (gitu-gps/ins tracking unit) development and deployment; Slivinsky, S.; Aerospace Conference, 2003. Proceedings. 2003 IEEE,vol. 4, Mar. 8-15, 2003 pp. 4_1943-4_1956.*

Research on route planning and map-matching in vehicle GPS/dead-reckoning/electronic map integrated navigation system Li Jie; Fu Meng-yin; Intelligent Transportation Systems, 2003. Proceedings. 2003 IEEE, vol. 2, Oct. 12-15, 2003 pp. 1639-1643 vol. 2.*

Application of GPS navigation to space flight; Goodman, J.L.; Aerospace, 2005 IEEE Conference Mar. 5-12, 2005 pp. 1837-1852; Digital Object Identifier 10.1109/AERO.2005.1559476.*

Fujitsu The Possibilities Are Infinite, http://pr.fujitsu.com/en/news/2002/06/10.html, pulled from internet Mar. 11, 2003, pp. 1-4.

Visual Information Display Research Specific to navigation Systems, http://www.fhwa.dot.gov/tfhrc/safety/pubs/95153/sec5/body_sec5_03_03.html, pulled from internet Mar. 11, 2003, pp. 1-4.

Adventure Accessories Hummer Outfitters 1-888-600-4268, http://www.adventureaccessories.com/Adventure/Navigation.html, pulled from internet Mar. 11, 2003, pp. 1-5.

How Stuff Works, http://electronics.howstuffworks.com/gps.htm/printable, pulled from internet Mar. 12, 2003, pp. 1-9.

* cited by examiner

VEHICLE NAVIGATION SYSTEM WITH MULTI-USE DISPLAY

This application claims the benefit of U.S. Provisional application Ser. No. 60/456,564, filed Mar. 24, 2003.

FIELD OF THE INVENTION

The present invention generally relates to a multi-functional vehicle navigation system (e.g., a GPS based system, land based triangulation system, etc.,) and, more particularly, is related to a system and method which provides for the replacement of a visual display directed at navigational features (e.g., maps, coordinates and operational input means) with a visual display directed at non-navigational features such as a favorite photo image.

BACKGROUND OF THE INVENTION

In general, the currently used GPS or global positioning vehicle navigation systems make it possible for drivers to pinpoint their exact geographic location as their GPS ground receiver interacts with a network system of orbiting satellites. GPS ground receivers collect satellite signals from the GPS satellite network and use that information to recognize the vehicle's position. The vehicle's location is determined in terms of a reference format (e.g., latitude and longitude) using the GPS ground receiver.

In addition to GPS ground receivers providing drivers with information about their current geographic location, they can also generate driving directions to assist drivers in reaching their final destination. Some ground receivers can also estimate the driver's arrival time to a specific destination by calculating the speed and direction of travel. A GPS receiver can thus be used in association with a background map to place a user's vehicle at a particular location on that map, and, if a receiver is left on, the system can trace a path across a map as the receiver moves. In other words the receiver can stay in constant communication with GPS satellites to see how its location is changing. With this information and its built-in clock, the receiver can provide several pieces of information:

- How far you've traveled (odometer)
- How long you've been traveling
- Your current speed (speedometer)
- Your average speed
- A "bread crumb" trail showing you exactly where you have traveled on the map
- The estimated time of arrival at your destination if you maintain your current speed To obtain this last piece of information, the user needs to give the receiver the coordinates of the desired destination by way of inputting location data in system memory made available for storing navigation data. This feature of inputting location data also allows a user make a record of specific points on Earth. The basic unit of user input is the waypoint. A waypoint is the coordinates for a particular location. A user can save this in the receiver's memory by:

- A user can tell the receiver to record its coordinates while at a particular location.
- A user can find the location on a map (the internal map or another one) and enter its coordinates as a waypoint.
- A user can also combine a series of different waypoints to form a route. One way to use this function is to periodically record waypoints as a trip is made so as to provide for backtracking, or to allow for following the same route again in the future.

The vehicle navigation systems are equipped with a display screen that illustrates the active reference map and highlight the driver's current position relative to the active map. The vehicle navigation systems have map data stored in internal memory and/or derived from map information stored on computer diskette, CD-ROM, or other computer memory storage device. Under prior art GPS systems, the display screen will only display the various reference map or driving map and other navigation based information (includes operating means to have the system perform its navigational function such as zoom and menu bars) stored or otherwise made available.

Even with improvements in map imaging (e.g., more recent introduction of display drivers that can accommodate 3D-mapping), a navigation display is not appealing or interesting to an operator or passenger of a vehicle when it is not being directly relied upon for navigation purposes. However, these systems are typically retained "on" for long periods once activated for convenience.

SUMMARY OF THE INVENTION

Embodiments of the present invention provide a system and method for allowing the driver to change the appearance images on the display screen in a vehicle's navigational system.

Briefly described, in architecture, one embodiment of the system, among others, can be implemented as follows. A system for displaying a non-navigational image on a vehicle navigation system includes a displaying means, an image acquiring means and a switching means. The displaying means is capable of displaying a navigational image on the vehicle navigation system, and the image acquiring means is capable of acquiring a non-navigational image. The switching means is capable of switching the display of the navigational image on the vehicle navigation system to the display of the non-navigational image on the vehicle navigation system.

Embodiments of the present invention can also be viewed as providing methods for allowing the driver to change the appearance images on the display screen in a vehicle's navigational system. In this regard, one embodiment of such a method, among others, can be broadly summarized by the following steps: (1) displaying a navigational image on the vehicle navigation system; (2) acquiring the non-navigational image; and (3) switching the display of the navigational image to the display of the non-navigational image.

Other systems, methods, features, and advantages of the present invention will be or become apparent to one with skill in the art upon examination of the following drawings and detailed description. It is intended that all such additional systems, methods, features, and advantages be included within this description, be within the scope of the present invention.

DETAILED DESCRIPTION OF THE PREFERRED EMBODIMENTS

The present invention relates to an expansion in the capabilities in a vehicle's navigational system. The current invention provides greater flexibility by allowing the driver to change the appearance of the display screen. Instead of the constant images of reference maps or other navigational information, the driver can display more desired non-navigational images such as photos or other desired images or data formats during periods when the navigational portion of the navigation system is not used or needed.

The navigation system of the present invention features means for inputting non-navigational image data (e.g., image data represented by a personal digital photo) to the display of, for example, a GPS based vehicle navigation system. For example, a disk drive or alternative data transfer means such as a digital photo cartridge receiver is provided as a means to input the non-navigational image data to the GPS navigational system.

The non-navigational image data input means is preferably connected to a communication port of the vehicle navigation system such as a USB (universal serial bus) port provided on the display monitor (e.g., the front face of a display housing of a GPS navigation system). The data transfer means disk drive allows the driver to display on the display screen images more desirable than map or navigation images such as a desired non-navigation related image (e.g. a photo of a recent vacation stop, a desired person (family or friends), a pet, a sports or movie star persona, a nature scene, a favorite automobile or other object, etc.) The data transfer means also allow the driver to download photos from a digital camera onto the GPS screen for immediate viewing in full screen size.

The driver has the capability of manually switching from the maps to a personal photo or the personal photo will be displayed automatically if the GPS system is not needed and/or not used for a set period of time. For instance, a touch screen manual switchover means represents a preferred embodiment wherein upon contact with the navigation image display screen (preferably a designated switchover triggering device such as a designated and represented image switchover touch screen contact location) the user can activate a switch over from the navigation screen to a non-navigation display screen.

An automated "no need" switchover means is also preferably featured under the present invention and operates to switch over a navigation display image with a non-navigation display image when the system determines there will not be a need for the navigation display for a predetermined period of time. For example, the vehicle navigation system, in monitoring information such as the current location, local map characteristics and/or desired destination, has the information available for the no need switchover means to make a determination as to whether the current travel status makes for an extended period (e.g. 10 to 100 or more minutes or 10 to 100 or more miles) before there is a need to illustrate an intersecting road or landmark (e.g. a long road or long interstate preset by the operator or a part of a "trip tick"). If such a "no need for an extended period" determination is made, then the switchover means operates to display a non-navigation image instead of a current navigation image.

Means to automatically reinitiate the map/navigation image is also preferably provided under the present invention (with the system preferably maintaining real time positioning while the system is on and even when the non-navigation display is displayed). As an example, the reinitiating means is designed to reinitiate the map image by, for instance, replacing the non-navigation image at a point prior to the next potential turn or landmark. The reinitiating activation is preferably based on a preset or programmed proceeding period of time or mileage distance (e.g., 1 to 3 miles or 1 to 5 minutes) prior to the potential next turn or landmark. The period or distance being sufficient to re-enable user map monitoring to enable the user to timely make any decision needed regarding vehicle navigation. The reinitiating means can operate with or without a consideration of current vehicle speed, although the latter is more preferable (e.g., if traveling more than 50 mph, a 3 minute or more reactivation time window is preferable than a 1 minute time window, while a 1 minute period might be deemed better suited for a 30 mph setting).

A countdown or count-up "time of navigation display" switchover means is also preferably featured under the present invention such as an alternate to the above described "no need" automatic switchover means or as a supplemental automatic switchover means. For example, a timer is set upon activation of the map screen and if no activity is sensed or if there is an extended period that transpires, the switchover is activated. Preferably, relative to this latter feature, there is a lock out or time of display maintenance adjustment feature to preclude or extend the switchover operation when, for example, the operator knows there will be a period of heavy reliance on the navigation system as when traveling in a congested area that is entirely not familiar to the operator.

The present invention also preferably features toggle type switchover means which allows the user to switch back and forth between the navigation display and the non-navigation display. This preferably features a single toggle activator as in a touch screen image presented on both the navigational and non-navigational image at, for instance, a similar location. In an alternate embodiment of the invention, and one which avoids having the user hunt for a switchover means trigger location (at least in going from a non-navigation to navigation display mode), the entire screen display functions as a touch or contact sensor which, when touched, functions to initiate a switch over to the navigation image. In the situation where the navigation display screen already has navigation related touch screen areas, a non-full screen switch over trigger sensing area is preferably utilized and the system differentiates the different touch screen functioning modes depending on the navigation/non-navigation status (e.g. full screen touch screen capability under non-navigation display mode and designated non-full screen contact region under navigation mode).

An alternate embodiment of the present invention preferably also includes means for presenting a set of favorite images as in a set of photos or pictures. This includes for example means for simultaneously displaying a plurality of non-navigation images and choosing or setting a desired non-navigational image. For example, when the display screen is in a non-navigation display mode, a scroll or means for choosing amongst a variety of stored or available favorite images is provided (e.g. the ability to replace one favorite full screen image with a next until a desired one is reached or the presentment of a plurality of favorite images (e.g., in reduced image size format) in a non-navigation display mode to allow an operator to pick a desired one (e.g., to go to full screen image mode for the chosen one).

In an alternate embodiment (e.g., one not involving touch screen choosing amongst a plurality of favorite images), a navigation operation feature such as direction arrows or a zoom in or out set of buttons associated with the navigation screen is maintained on the non-navigation screen and converted in function from its navigation function mode to a non-navigation function mode (in association with a switch to the non-navigation or favorite image display mode) to enable an operator to scroll through or visualize a variety of favorite images (either in sequence or through a multi-display format). Thus, with an embodiment providing for the choosing of a favorite image amongst a group of favorite images presented at once in the non-navigation display mode, means are provided for selecting one amongst the group and having the selected one replace or overlay the other options and appear as a full screen image (e.g. a touching of a depiction of the favorite image occupying a touch screen location to convert from a reduced size to a full screen size).

The non-navigation images are either maintained in the background (not displayed in any fashion) and brought into view as a replacement to the navigation screen upon activation of the switchover means or, in an alternate embodiment of the invention, maintained in reduced form on the navigation screen (and preferably in a non-interfering location relative to the navigation function) as an indication as to what favorite non-navigation image is available for full screen display upon switchover. Thus, a single favorite image is shown in reduced form on the screen (e.g., along a display housing/screen border) or a group of images in reduced size form is featured, preferably also in a non-interfering location (e.g. a plurality of touch screen button locations in which the loaded images are independently presented and can be varied upon the loading of new non-navigational images). For systems not featuring direct (e.g., touch screen) image option choosing, a differentiator is preferably provided relative to the set of favorite images appearing on the navigation screen. The differentiator includes for example, a different degree of backlighting or a margin or border differentiator to illustrate the reduced image currently chosen for possible conversion from reduced to full screen appearance.

Also, the preferred manner of switching between the navigation and non-navigation displays includes, for example, single screen replacement or a layering or windowing of the navigation and non-navigation displays. Further, in returning to a navigation screen from a non-navigation screen, current map data is either reconstructed anew from the base map data source ("from scratch") or a renewing process is carried out wherein the previous map image data is stored in total or in part such as in a temporary memory location, and the still applicable date relative to the new, real time map status (which could be the same for a stationary vehicle or different for a moving vehicle) is reutilized.

Figure 1:
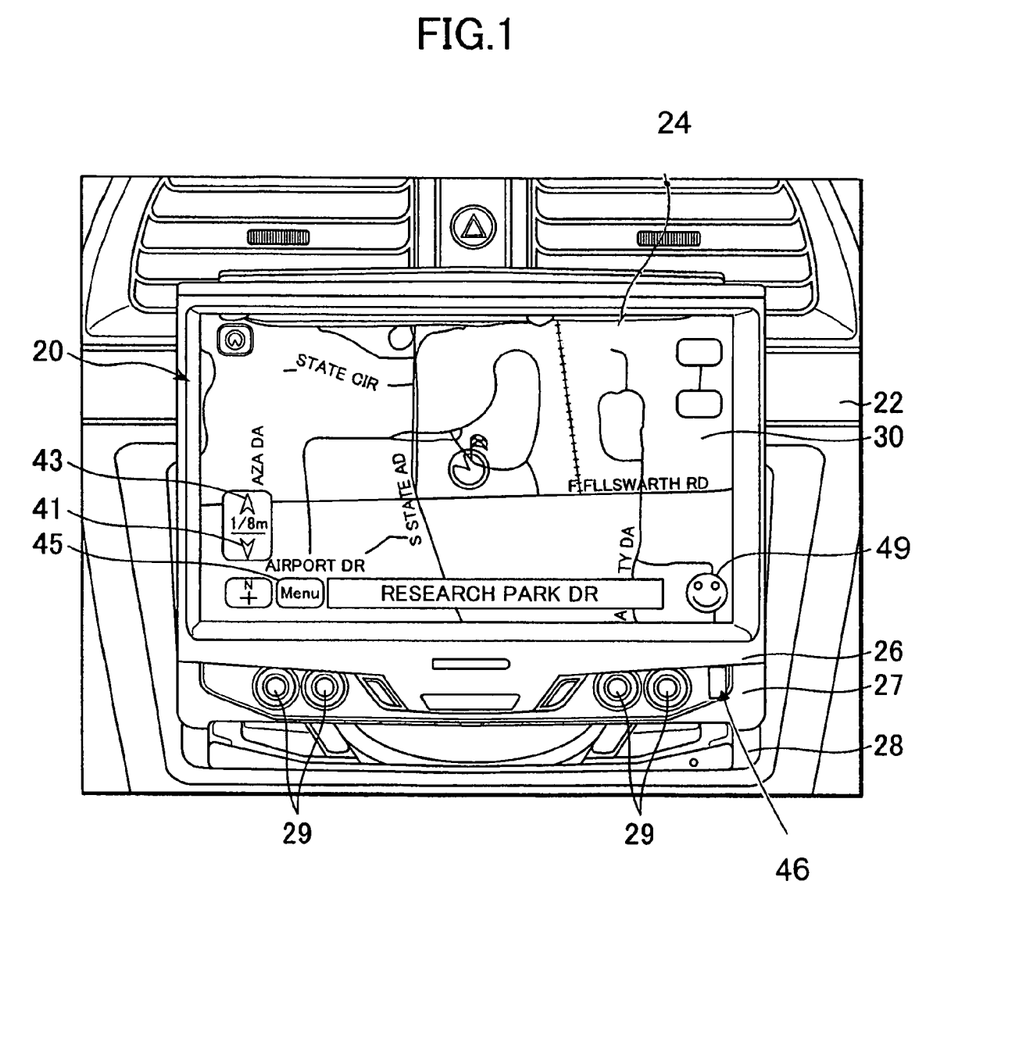
FIG. 1 shows an example of a GPS navigational system with screen in a navigation information display mode.

FIG. 1 illustrates vehicle navigation system 20 of the present invention in a standard navigation or travel information mode. As seen from FIG. 1, the vehicle navigation system 20 is preferably fixedly mounted in a preferred location such as on the dashboard 22 of a vehicle. System 20 preferably represents a standard or optional feature of a vehicle which is pre-wired for a purchaser of a vehicle to have at the time of initial purchase or later installed following purchase. While an automobile is illustrated as the vehicle, the term "vehicle" is used in a broad sense herein to include, for example, means in or by which someone or something is conveyed (e.g. a boat). Navigation system 20 features a GPS display monitor 24 with screen housing 26 with control base 27 shown supported on pivot stand 28. Various other vehicle mounting means are also featured under the present invention such as an independent vehicle navigation console in reach of a driver and/or passenger or a vehicle floor mounted support base. Under the present invention the vehicle navigation system is preferably mounted in fixed fashion (e.g., not readily removable or liftable from a support location in the vehicle without tools or releasable fasteners being activated)

FIG. 1 further illustrates GPS display monitor 24 with a standard image generator (not shown) and image display screen 30. A GPS source for position determination is preferred, although the present invention is applicable as well to other position determining means such as a land based navigation system (e.g. triangulation using position signal generators mounted in a vehicle travel region such as signal generators on a group of cell phone towers.)

Monitor 24 further comprises general characteristic variation buttons such as contrast, vertical limits, horizontal limits and on/off switches (generally represented by reference number 29 in FIG. 1 provided on control base 27).

Figure 2:
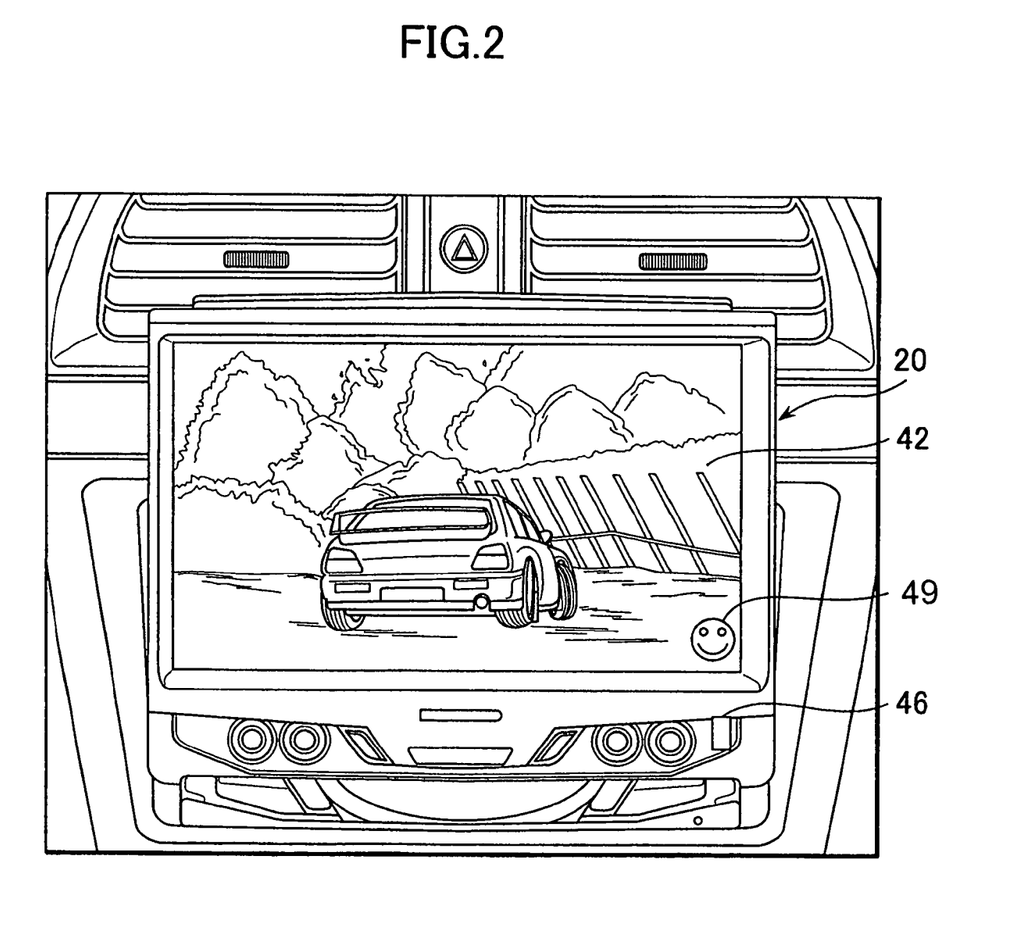
FIG. 2 shows the example of a GPS navigational system of FIG. 1 in a non-navigation screen image (e.g., favorite image) display mode.

FIG. 2 illustrates a switchover from the navigation mode display screen of FIG. 1 to a non-navigation display mode showing, for example, a non-navigation related image 42 featuring, for example, a display of a favorite photo covering or essentially covering (more than 75% or more preferably more than 90%) the screen portion formerly occupied by the map display (e.g., a full screen depiction).

Figure 3A:
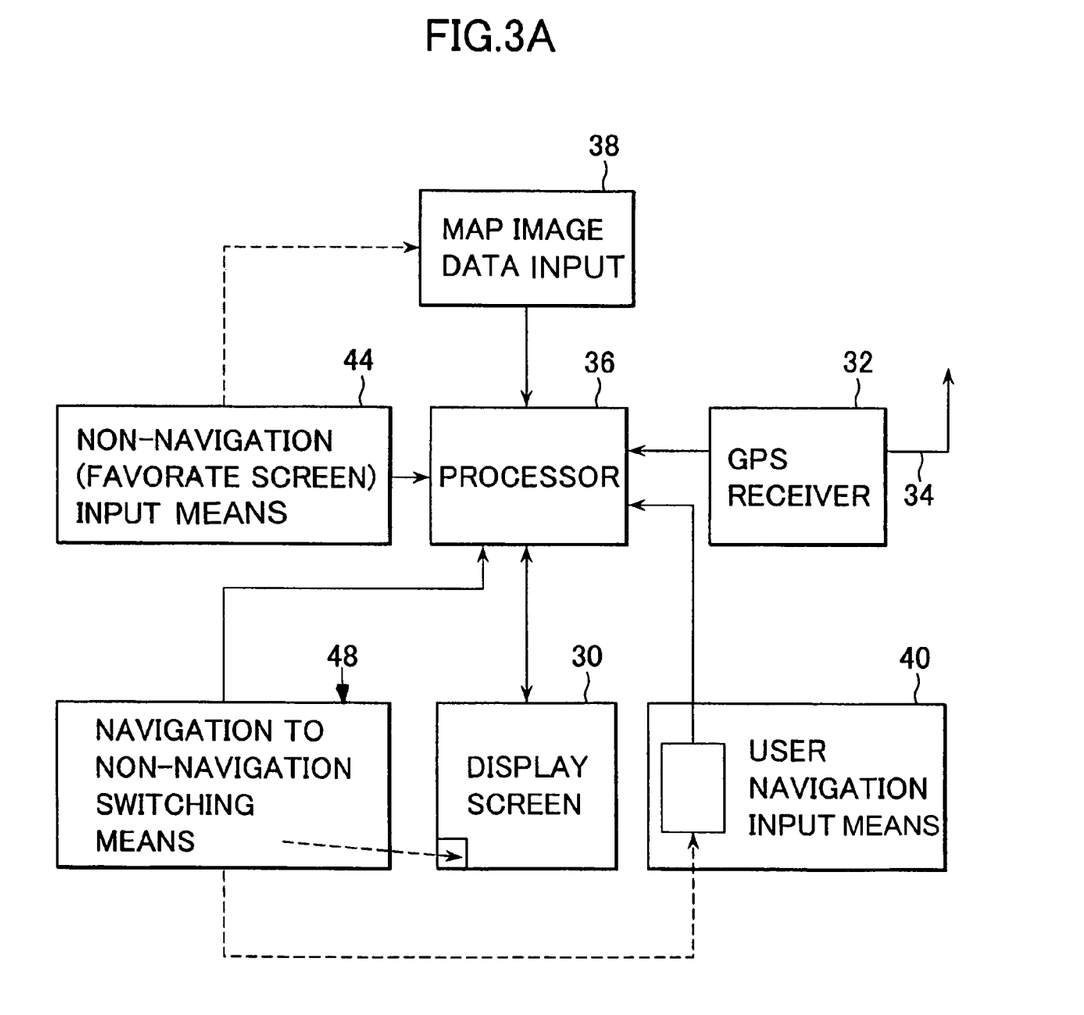
FIG. 3A shows a block diagram of an example of an embodiment of the present invention.

FIG. 3A provides a block diagram of an embodiment of the invention. As shown in FIG. 3A a GPS receiver 32 with antennae 34 interfaces with processor system 36 of the GPS navigation system. The GPS receiver 32 and antennae 34 can be any custom made or commercially available GPS receiver and antennae. The processor system 36 is preferably a hardware device for executing software, particularly that stored in memory (not shown). The processor system 36 shown can be any custom made or commercially available processor, a central processing unit (CPU), an auxiliary processor among several processors associated with a computer, a semiconductor based microprocessor (in the form of a microchip or chip set), a macroprocessor, or generally any device for executing software instructions. Examples of suitable processors for processor system 36 are discussed herein in further detail with regard to FIG. 3B.

Further illustrated in FIG. 3A are map image data supply means 38 and user navigation or travel input means 40. In operation, the processor system 36 uses the map image data provided by the map image data supply means 38 for generating a navigation image on the screen 30 of display monitor or screen display presentment means 24 (e.g., through a suitable display screen/processor interface). The image data supplied from the image data supply means can be obtained in a variety of ways such as from, for example, (i) map data stored on a portable map data holding means as in diskettes or CD's, and/or (ii) map cartridges or cards (with the image data supply means preferably having associated read/write means), and/or (iii) a more permanent (albeit read-writable) memory storage means (e.g. provided as a component of the navigation system wherein the image data supply means provides an interface between the data source and the processor), and/or a transmission of tagged GPS coded data source from, for example, a wireless data transmission means utilizing, for instance, radio waves, spread spectrum, microwave, satellite, optic, and/or (iv) an external communication unit such as a personal computer, a mobile phone or PDA (personal digital assistance) having map data for unloading, etc. The memory storage means can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory storage means may incorporate electronic, magnetic, optical, and/or other types of storage media.

The processor system 36 uses the received map data to display a map image from a selected map area (corresponding to the GPS sensed position) with the map image essentially filling the screen space (e.g., more than 90%) as shown in FIG. 1 to present the largest map display possible within the screen (which is typically limited in size to avoid taking up to much of the vehicle operator space). The map image is preferably centered (at least as a preferred initial setting) at the position of the navigation system as sensed by the GPS receiver with the navigation position represented in real time by some sort of indicia such as an arrow, colored dot or small vehicle depiction.

As represented in FIG. 1, various other navigation or transportation related information are often featured in navigation systems such as the geographical coordinates of the current position, the correct direction when traveling toward a specific destination, a compass rose, current speed, the estimated time of arrival, menu bar, map type, scale, zoom level, shift map directors, and distance to destination point designated, etc. These navigation related information displays are generally represented in FIG. 1 by reference number 41. The navigation system of the present invention preferably further comprises software for suggesting a preferred course to reach a desired destination from a present location based either on stored information or forwarded data such as the wireless system options outlined above.

User input device 40 in FIG. 3A provides a means for operator input relative to the navigation screen such as navigation information input of coordinate information or destination inquiries (keypad input of desired location) as well as manipulation of the image display features 41 described above through use of, for example, touch screen inputs (see the manipulatable scale and menu touch screen buttons 43 and 45 in FIG. 1).

FIG. 3A further illustrates non-navigation related image input device 44 preferably in communication with processor system 36 for inputting, for example, a favorite image such as the image 42 in FIG. 2, and means for switching the navigation related image (e.g., a function of the processor system 36 or an independent means preferably associated with a display screen interface (not shown)). In a preferred embodiment, the input means 44 is a stand alone disk drive interconnected with a USB port that is preferably positioned in front of the display, such as example port 46 shown in FIGS. 1 and 2. The input means 44 is preferably in communication with the display means of the system either through the and/or an alternate intermediary capable of receiving the favorite image data and replacing the map or navigation image display with the desired image(s).

Input means 44 provides an image data source either in real time with the display of the favorite image or more preferably as a means for feeding display screen data (e.g. a digital favorite photo of a vehicle occupant) to an intermediate data storage means from which the processor can derive the favorite image data at the time of activation or switchover by the user (as explained in more detail below). Also, image input device 44 can be different (as shown) or in common or in a sharing relationship relative to the map image data input device 40 and in communication with the processor (or other display control means) providing the means for the displaying of the user's favorite image on the display screen.

FIG. 3A further illustrates navigation/non-navigation switchover means 48 for providing for the presence of the favorite image on the screen which in a preferred embodiment features a switchover trigger or means for initiating or activating switching from a navigation mode to a non-navigation mode and means for carrying out a display image transfer upon activation of the initiation means. Thus, if the navigation image is present on the display screen and the switchover means is activated, the means for replacing the navigational image with a non-navigational image (preferably full screen such as 90% to 100%) is activated to achieve the screen display changeover. This switchover trigger or initiation means is preferably present on the screen image of the map image screen as a touch screen activator represented in FIG. 1 by the "smiley face" touch screen display 49, although other switchover activation means are also featured under the present invention such as a voice command switchover activation means trigger, a housing based trigger or a remote from display monitor trigger.

When the switchover means 48 is activated (e.g., an activation means is depressed as in the depressing of touch screen button 49 shown in FIG. 1) the switchover means activates the system to have the favorite image appear in place of the map image by, for example, single screen complete replacement or a windowing or layering of images processes (preferably on a full screen default mode). Switchover means 48 can also be a toggle switching means providing for a return or presentation of the map image when the current display mode is the non-navigation mode and the switchover is activated, and vice versa. Alternatively, the present inventions features separate switchover activation means with common or independent means for carrying out a display image transfer, for example, means for switching going from one display mode to another, such as the above touch screen button for the favorite image, and a separate switchover activation means (e.g., touch pad or button) either on the screen or at an alternate location as in the display housing region.

The dash line in FIG. 3A associated with map image data input means 38 is illustrative of the above described non-navigation display image input means 44 in common or sharing components of the map image data input. The dash lines in FIG. 3A associated with display screen 30 are illustrative of the option of having the switchover activation means available on the screen face instead of being independent or as a feature available in association with the user navigation input means 40 such as an option available upon pressing a menu display forming part of means 40.

The switchover means and non-navigation display image input means embodiments of the present invention can be implemented in hardware, software, firmware, or a combination thereof. In the preferred embodiment, the switchover means is implemented in software or firmware that is stored in a memory and that is executed by a suitable instruction execution system such as processor system 36. If implemented in hardware, as in an alternative embodiment, the switchover means can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The non-navigation display image input means is preferably implemented in the firmware and hardware. When implemented in hardware, the non-navigation display image input means can be implemented with any or a combination of the following technologies, which are well-known in the art. In the context of this document, a "non-navigation display image input means" can be any means that can contain, store, communicate, propagate, and transport the non-navigation display image for use by or in connection with a vehicle navigation system, apparatus, or device.

The non-navigation display image input means can be, for example but not limited to, an electronic, magnetic, optical, electromagnetic, infrared, or semiconductor system, apparatus, device, or propagation medium. More specific examples (a nonexhaustive list) of the non-navigation display image input means would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM or Flash memory) (electronic), an optical fiber connection (optical), and a portable compact disc read-only memory (CDROM) (optical). Finally, the non-navigation display image input means may further include devices that convey both inputs and outputs, for instance but not limited to, a modulator/demodulator (modem; for accessing another device, system, or network), a radio frequency (RF) or other transceiver type interface (i.e. a WiFi (IEEE 802.11x) or cellular type connection), a telephonic interface, a USB or other type of electronic or optical interface.

In the preferred embodiment, the non-navigation display image input means is implemented utilizing an USB port on the front of the vehicle navigation system 20. In this way, a user can connect a digital camera (not shown) or other type of image capture/storage device to the vehicle navigation system using the USB port. In an alternative embodiment, the non-navigation display image input means can be implemented using a WiFi type connection. In another alternative embodiment, the non-navigation display image input means can be implemented using a cellular type connection as a source of image data to be utilized upon activation of switchover means of the present invention.

Figure 3B:
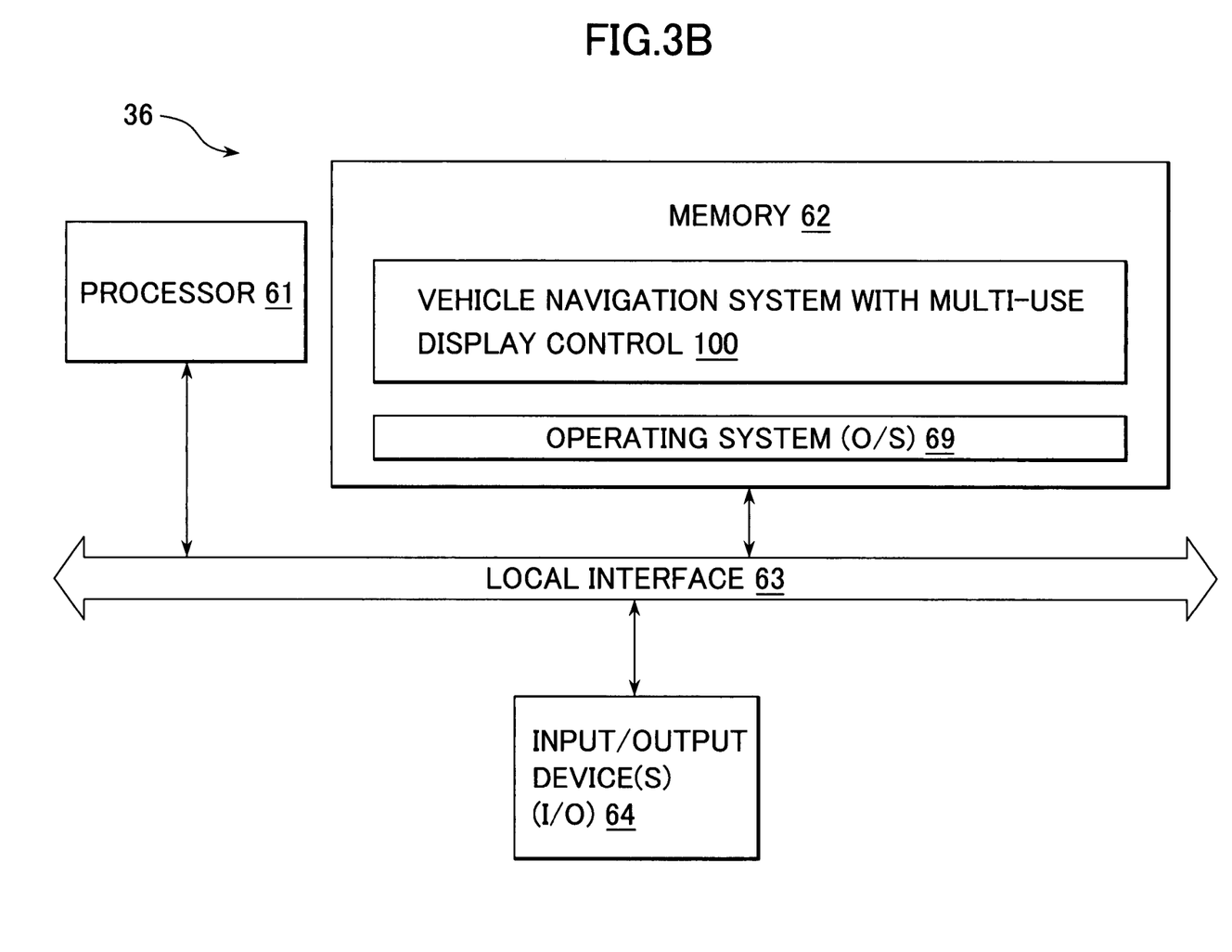
FIG. 3B shows an example of a general purpose processor system that can be utilized in the Vehicle Navigation System with Multi-Use Display embodiment of the present invention.

FIG. 3B illustrates an example of a general purpose processor system that can be utilized in the Vehicle Navigation System with Multi-Use Display control 100 embodiment of the present invention.

The Vehicle Navigation System with Multi-Use Display control 100 of the present invention can be implemented in software (e.g., firmware), hardware, or a combination thereof. For example, in one embodiment of the invention, the Vehicle Navigation System with Multi-Use Display control 100 is implemented in software, as an executable program, and is executed by a special or general purpose processor. An example of a suitable processor that can implement the Vehicle Navigation System with Multi-Use Display control of the present invention is discussed herein below. In FIG. 3B, the Vehicle Navigation System with Multi-Use Display control is denoted by reference numeral 100.

Generally, in terms of hardware architecture, as shown in FIG. 3B, the processor system 36 includes a processor 61, memory 62, and one or more input and/or output (I/O) devices 64 (or peripherals) that are communicatively coupled via a local interface 63. The local interface 63 can be, for example but not limited to, one or more buses or other wired or wireless connections, as is known in the art. The local interface 63 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 61 is a hardware device for executing software, particularly that stored in memory 62. The processor 61 can be any custom made or commercially available processor, a central processing unit (CPU), an auxiliary processor among several processors associated with the processor system 36, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86, i960, Pentium, Celeron, Xeon or Itanium series microprocessor from Intel Corporation, a PowerPC microprocessor from IBM, a Sparc microprocessor from Sun Microsystems, Inc, or a 68xxx series microprocessor from Motorola Corporation.

The memory 62 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 62 may incorporate electronic, magnetic, optical, and/or other types of storage media. Note that the memory 62 can have a distributed architecture, where various components are situated remote from one another, but can be accessed by the processor 61.

The software in memory 62 may include one or more separate programs, each of which comprises an ordered listing of executable instructions for implementing logical functions. It should be noted that the inventors have shown the vehicle navigation system with multi-use display as an integrated system in order to simplify the description of the present intention. It should be recognized, however, that the example logic illustrated in steps 104-112 may be embodied in a separate non-navigation image generation and display system. Along with the separate non-navigation image generation and display system would be the additional instructions to link the present intention with an existing vehicle navigation system.

In the example of FIG. 3B, the software in the memory 62 includes the Vehicle Navigation System with Multi-Use Display control 100 in accordance with the present invention and a suitable operating system (O/S) 69. A nonexhaustive list of examples of suitable commercially available operating systems 69 is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., Symbian OS available from Symbian, Inc., PalmOS available from Palm Computing, Inc., and Windows CE available from Microsoft Corporation). The operating system 69 essentially controls the execution of other computer programs, such as the Vehicle Navigation System with Multi-Use Display control 100, and provides scheduling, input-output control, file and data management, memory management, and communication control and related services.

The Vehicle Navigation System with Multi-Use Display control 100 may be a source program, executable program (object code), script, or any other entity comprising a set of instructions to be performed. When a source program, then the program needs to be translated via a compiler, assembler, interpreter, or the like, which may or may not be included within the memory 62, so as to operate properly in connection with the O/S 69. Furthermore, the Vehicle Navigation System with Multi-Use Display control 100 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 64 may include input devices, for example but not limited to, a keyboard, mouse, scanner, microphone, etc. Furthermore, the I/O devices 64 may also include output devices, for example but not limited to, a printer, display, etc. Finally, the I/O devices 64 may further include devices that communicate both inputs and outputs, for instance but not limited to, a NIC or modulator/demodulator (for accessing other files, devices, systems, or a network), a radio frequency (RF) or other transceiver, a telephonic interface, a bridge, a router, etc.

The processor system 36 may further include a basic input output system (BIOS) (omitted for simplicity). The BIOS is a set of essential software routines that initialize and test hardware at startup, start the O/S 69, and support the transfer of data among the hardware devices. The BIOS is stored in ROM so that the BIOS can be executed when the processor system 36 is activated.

When the processor system 36 is in operation, the processor 61 is configured to execute software stored within the memory 62, to communicate data to and from the memory 62, and to generally control operations of the processor system 36 pursuant to the software. The Vehicle Navigation System with Multi-Use Display control 100 and the O/S 69, in whole or in part, but typically the latter, are read by the processor 61, perhaps buffered in a memory within the processor 61, and then executed.

When the Vehicle Navigation System with Multi-Use Display control 100 is implemented in software, as is shown in FIG. 3B, it should be noted that the Vehicle Navigation System with Multi-Use Display control 100 can be stored on any computer readable medium for use by or in connection with any computer related system or method. In the context of this document, a computer readable medium is an electronic, magnetic, optical, or other physical device or means that can contain or store a computer program for use by or in connection with a computer related system or method.

The Vehicle Navigation System with Multi-Use Display control 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a memory.

In an alternative embodiment, where the Vehicle Navigation System with Multi-Use Display control 100 is implemented in hardware, the Vehicle Navigation System with Multi-Use Display control 100 can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
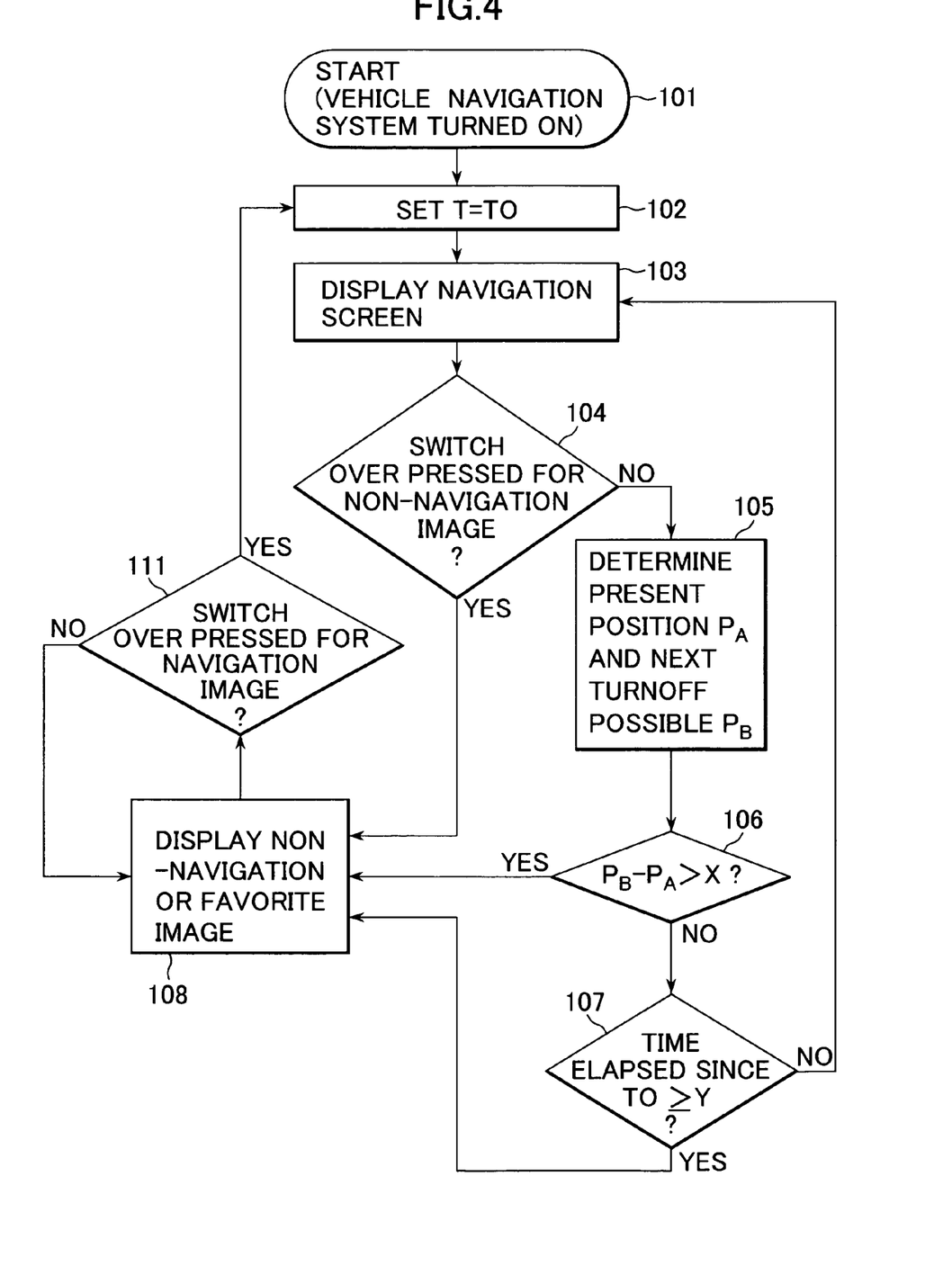
FIG. 4 shows a flow chart illustrating an example of some possible logic sequences in switching between non-navigation and navigation image display modes.

FIG. 4 is illustrative of a logic flow chart example for an embodiment of the invention. As shown in FIG. 4 when the navigation system is turned on at step 101, a timer is set to "To" and initiated to count up time at step 102. The turning on of the vehicle navigation system at step 101, further activates the display means and the current vehicle location is depicted relative to a pulled up map image based on the GPS receiver 32 information supplied together with the map data inputted from map data input means 38 at step 103. The system then determines whether switchover activation is detected at step 104.

If no switchover activation is detected at step 104, the system then carries out a comparison as to the present position (Pa) and the next potential turnoff or other need for map information such as a landmark (Pb) at step 105, to determine whether the distance is at a value large enough as to not require the map image to be displayed for the time being (e.g. a long road or long interstate preset by the operator or a part of a "trip tick") at step 106. For example, a set period for distance X of 10, 20 or 30 miles with or without a speed limit criteria (e.g. choosing a 10 mile period if current or average speed over an earlier period of time did not exceed 40 mph or 30 miles if the current speed is 55 or higher mph). Rather than distance, the comparison in the "no need" mode carried out at step 106, can be made on estimated time with or without updated speed sensing. An estimated 10, 20 or 30 minutes (e.g. using the GPS distance to next location determination means) relative to the current position and, for instance, the next possible turnoff or landmark. If a determination is made that there will be a sufficiently long distance or time period at step 106, the system activates an automatic switchover to the favorite display mode as depicted in FIG. 4 at step 108. Otherwise, the system goes to step 107 or alternatively returns to step 103 (not shown).

As an alternative to the above described "no-need" automatic conversion or as a supplement (e.g. many possible choices of turnoff, but operator not relying on system over a prolonged period), a check is made at step 107, as to whether a time period has expired with the vehicle navigation system "on" that is greater than or equal to a preset time Y (e.g. 10, 20, 30 minutes being illustrative). This time monitoring can be either based solely on the time period from initiation regardless of the activity of the user or, more preferably, a review is made during that potential period in the logic circuit (not shown) for any operator manipulation of the navigation input controls (e.g., zoom mode) and, if so, the time period is reset to "To" on each instance and a sequence reinitiated checking on either the time elapsed since the last navigation system input equal to or exceeds Y or both that and the "no need" analysis under steps 105 and 106. If the time period Y is determine to have equaled or surpassed value Y then step 108 of displaying the favorite image is carried out. Repeated checks are then made while in the non-navigation display mode (e.g., on the millisecond level) as to whether there has been activated the switch back trigger (e.g., touching the favorite image screen) at step 109. If so, "To" set to 0 at step 102, and the navigation display is reset at step 103 to continue operation.

Any process descriptions or blocks in the flow chart should be understood as representing, for example, modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Figure 5:
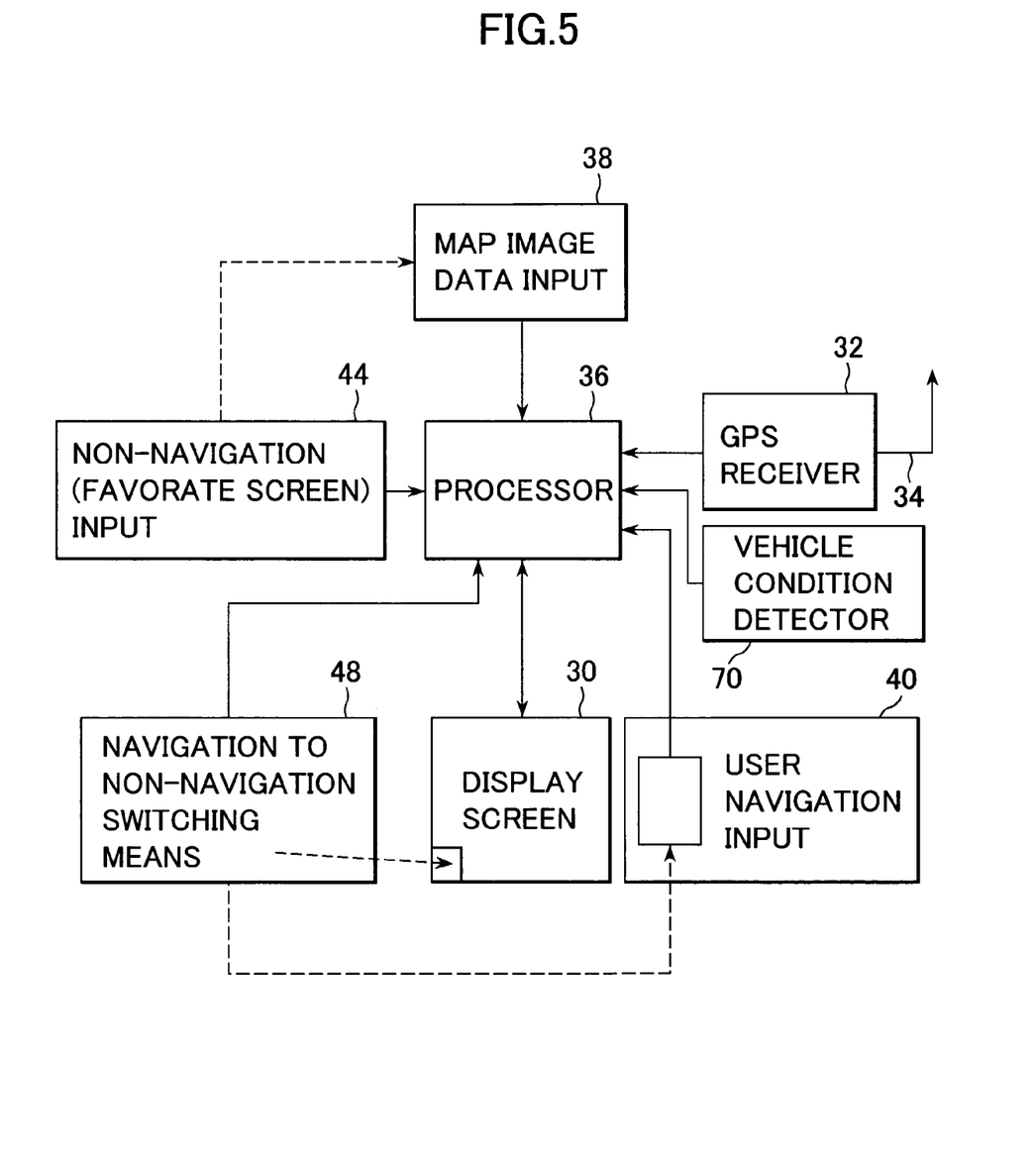
FIG. 5 shows a block diagram of another example of an embodiment.
Figure 6:
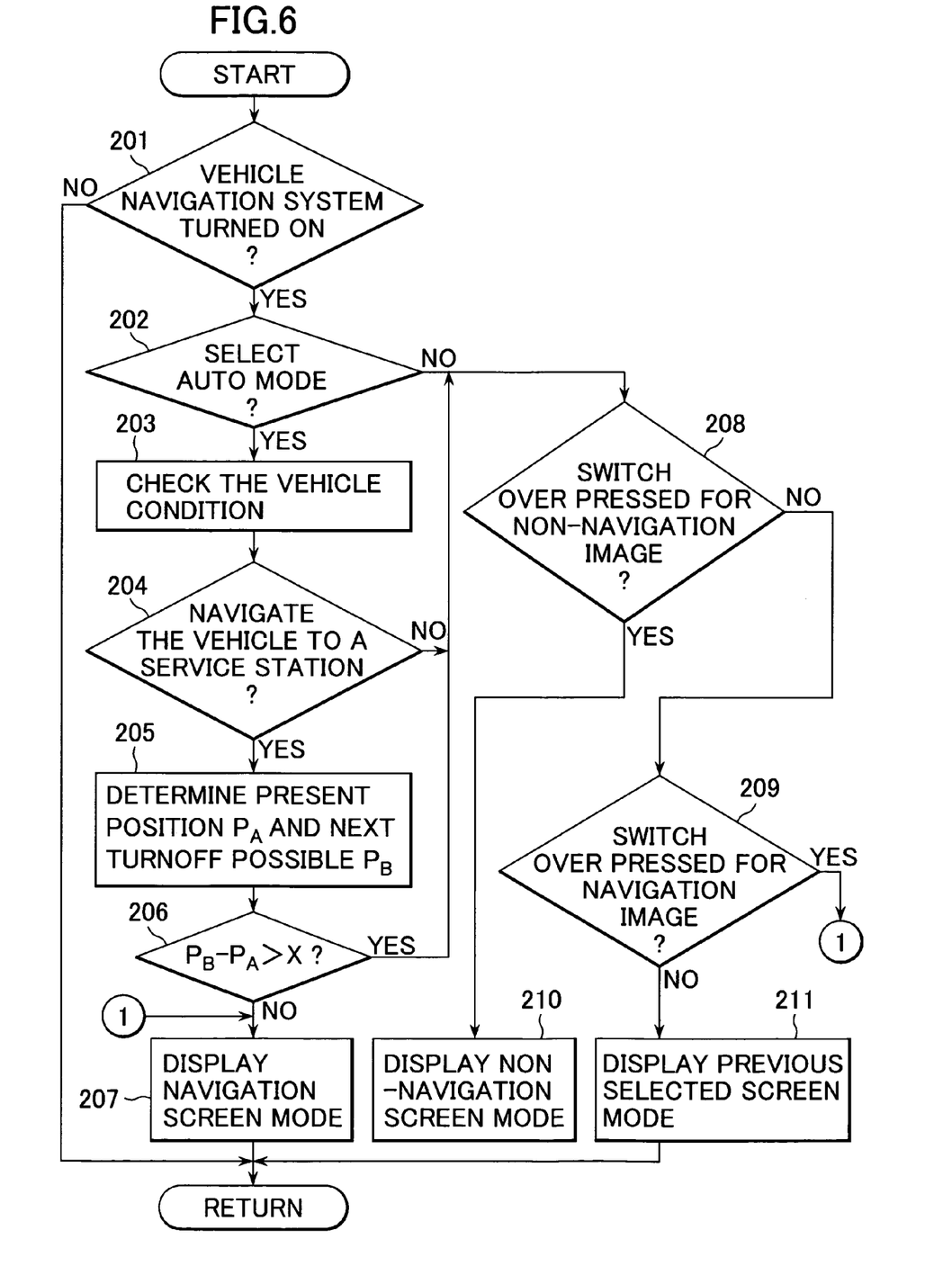
FIG. 6 shows a flow chart illustrating another example of some possible logic sequences in switching between non-navigation and navigation image display modes corresponding to FIG. 5.

FIGS. 5, and 6 illustrate alternate embodiment of this invention.

FIG. 5 illustrates a block diagram of alternate embodiment having a vehicle condition detector 70 for detecting the vehicle conditions. FIG. 6 illustrates a logic flow chart example. Particularly, in this embodiment, display screen mode including the navigation screen mode and non-navigation screen mode is selected based on the vehicle condition and a distance between a present position and turnoff possible point or landscape. The system selects the display screen mode as navigation screen if the vehicle condition is judged as checking or repairing condition which is required checking or repairing at the service station such as a gas station, car dealers, or maintenance factory. Furthermore, when the distance between a present position and turnoff possible point or landscape is within a predetermined distance, e.g. 10, 20, 30 miles, the display mode is set to the navigation screen mode.

On the other hand, the car condition is good, or even if the car condition is judged as checking or repairing condition, the distance between the present position and next turnoff possible point or landscape is not within the predetermined distance, in these cases, the non-navigation screen mode is selected.

FIG. 6 shows the flow chart for the process routine of this embodiment in detail. At first, the step 201 checks whether the navigation system is turned on or not. If the system is turned off, the system exits this routine. If the system is turned on, the system goes to the step 202 for judging whether an auto mode, which is automatically changing the display screen mode between navigation mode and non-navigation mode, is selected or not. The driver can select the auto mode or a fixed mode, which displays the driver selected mode on the screen (display screen mode does not change automatically). If the auto mode is selected, the system goes to step 203. If not, the system goes to the step 208 for judging whether the non-navigation mode is selected or not. The non-navigation mode is selected, the system goes to the step 210 for displaying non-navigation screen mode. If not, the system goes to the step 209 for judging the navigation screen mode is selected. If the navigation screen mode is selected, the system goes to the step 207 in order to display the navigation screen mode. If the navigation screen mode is not selected, the system goes to the step 211. Accordingly, on the step 211, a previous selected screen mode is displayed on the display (that is, the display mode does not change). For example, the present display mode is navigation screen mode, there is no selection at the step 208 and the step 209, this time, the navigation screen mode continues as the previous selected screen mode. Furthermore, in this embodiment, the initial state is set as the navigation screen mode. That is, the first procedure, and there is no operation of switch in the steps 208 or 209, the navigation screen mode is displayed on the screen.

On step 202, if auto mode is selected, the system goes to step 203. On the step 203, the vehicle condition including tire pressure, fuel level, windshield washer fluid level or engine condition and so on is checked. On the step 204, if the fuel level is lower than a predetermined level such as 10 litter, the tire pressure is lower than a predetermined pressure, washer fluid level is lower than a predetermined level, or engine check lamp, which indicate the necessity of checking the engine to the driver, lights on, the system judges the necessity for navigating the vehicle to the service station including gas station, car dealers, or maintenance factory in order to check or repair the vehicle. Furthermore, the step 205 and 206, the distance between the present position and the next turnoff possible point or landscape is within a predetermined distance, the system goes to the step 207 for displaying the navigation screen mode. Herein, the judgment method of steps 205 and 206 is the same as the step 105 and step 106 in FIG. 4. On steps 204 and 206, the system judges not to navigate the vehicle to the service station, the system goes to step 208. The process of the steps 208 to 209 have already described above.

By this structure, the driver can select the auto mode or not, and if the system is in the auto mode, only that the vehicle is required to be navigated the service station and next turnoff or landscape being within the predetermined distance, the navigation screen mode is selected.

Figure 7:
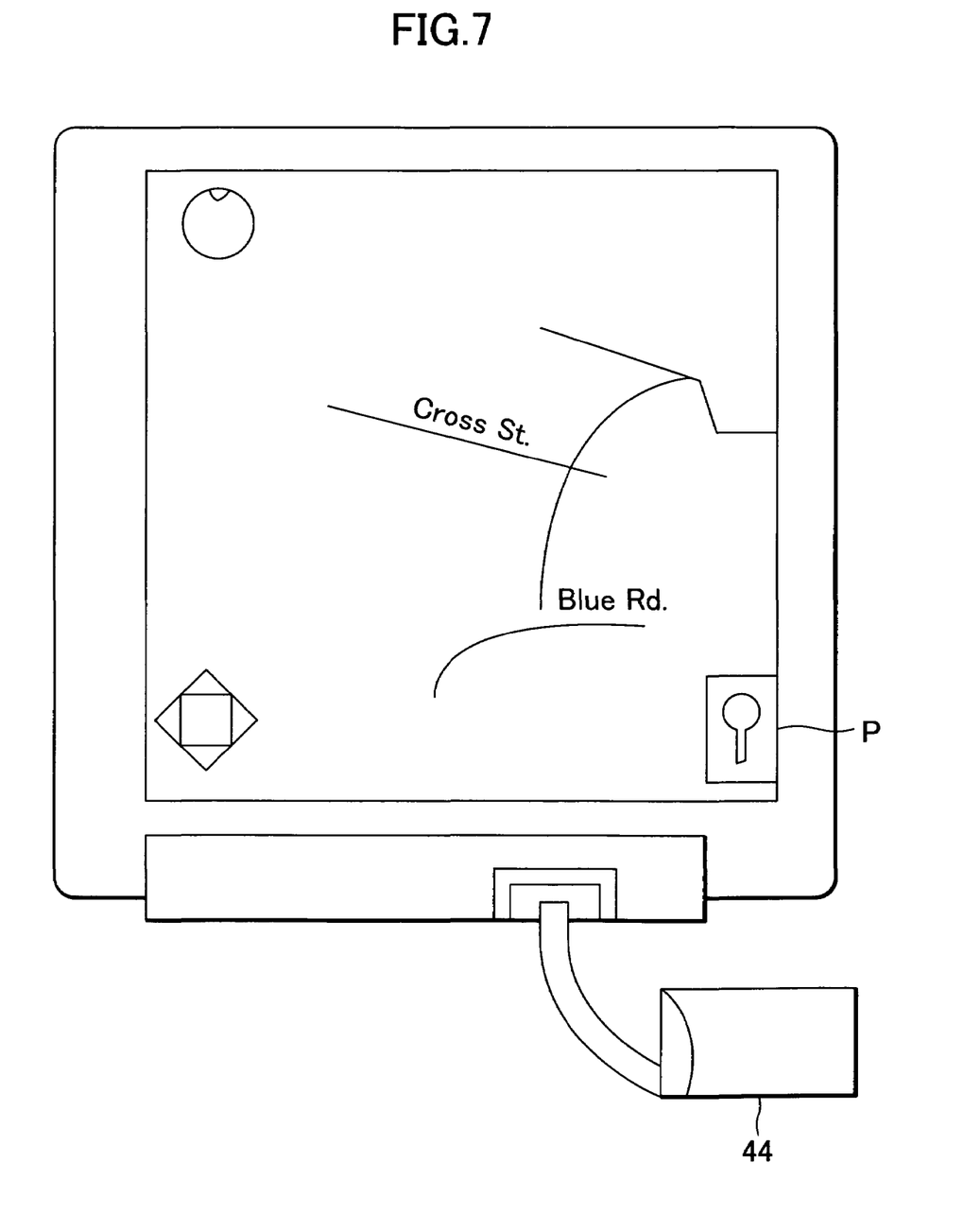
FIG. 7 shows an example of an alternate embodiment of the invention featuring a small overlap image representing the image to be presented in full screen mode upon switch over to a favorite full screen image mode.

FIG. 7 illustrates an alternate embodiment of the invention featuring a schematic presentation of the vehicle navigation system screen in navigation mode and with an inset or overlapped favorite image data display, such as a favorite photo P, in reduced form. Upon activation of the switchover activation means (e.g. a switchover touch screen trigger button behind the reduced size favorite photo image P thus doubling in function as the switchover trigger in similar fashion to the "smiley face" 48 in FIGS. 1 and 2), the map or navigation image is replaced with a full screen image of the favorite photo by the switchover means. FIG. 7 also illustrates disk drive 44 connected to a port (e.g. a USB port) provided on the display housing of the vehicle navigation system so as to provide a means to input digital photos or other favorite image data. Also, the reduced image P can appear in the larger view of the same for toggling back to the navigation image or, more preferably, a dissimilar image such as the aforementioned smiley face can appear in the favorite image mode to avoid a duplication of small and large same favorite image presentment or a general anywhere touch screen means can be utilized.

Figure 8:
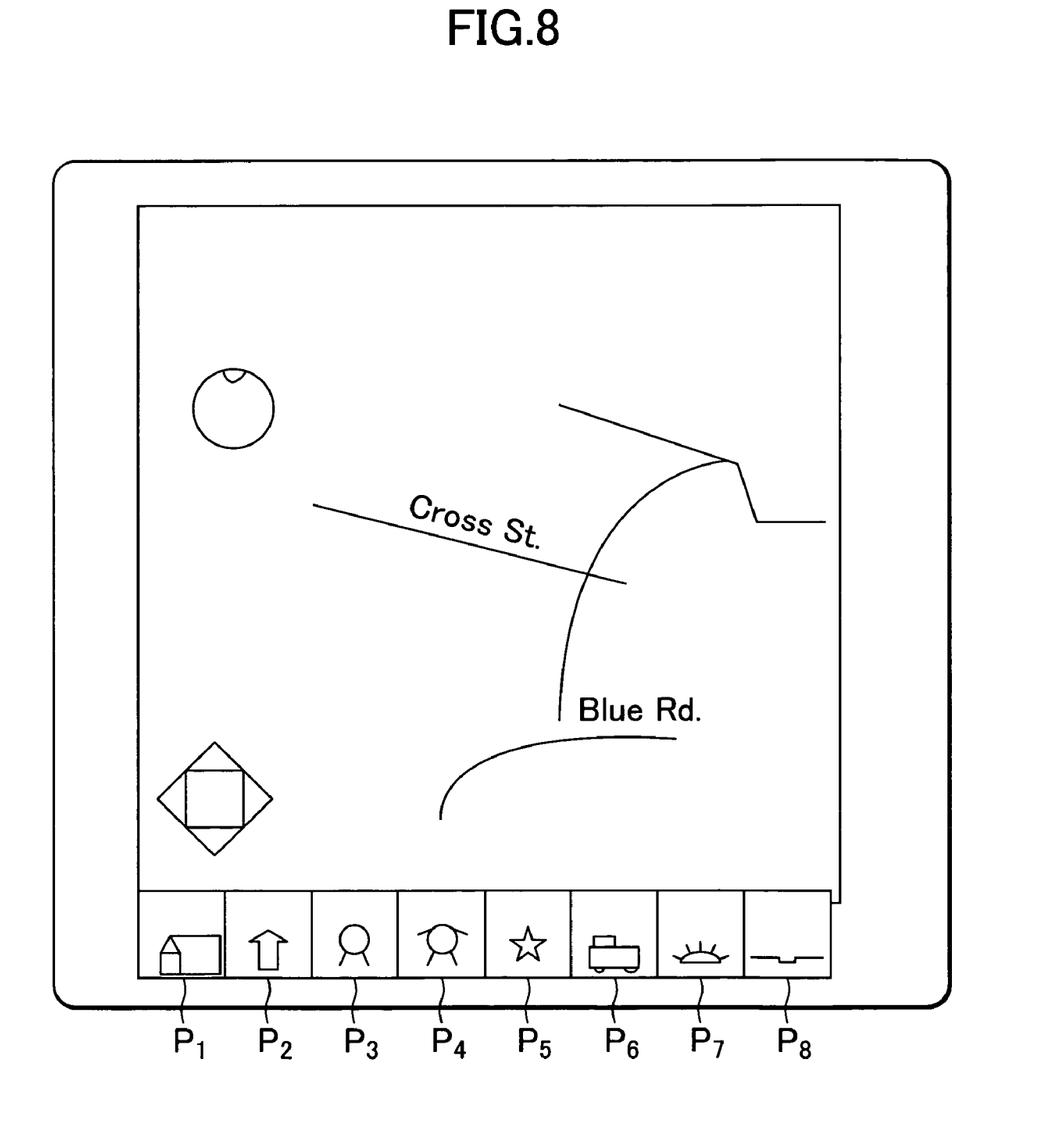
FIG. 8 shows an alternate embodiment similar to FIG. 5 but with a variety of optional favorite images displayed and toggle selection means.

FIG. 8 illustrates an alternate embodiment of the invention which presents a similar view as in FIG. 7 but with the front face of the housing and the map image screen only shown. The embodiment of FIG. 8 illustrates a reduced multi-image display of optional favorite or non-navigational images on the navigation screen. As shown in FIG. 8, there is provided eight reduced in size images (although the invention features higher and lower amounts such as an amount corresponding to an average number of images that can be saved in a digital camera) in a non-interfering location relative to the map image (e.g. small images along the screen face border). If a user desires to switch from the navigation display to a non-navigation display selection means can be implemented to choose amongst P1 to P8, and once chosen the navigation screen is replaced by the chosen image in similar fashion as described above. Thus, the user is able to utilize the present invention to view photos on the ride home from a location where photos have been taken such as a sporting event or vacation designation either in reduced multi-view form on the navigation display or in full view in non-navigation display mode.

The option presentation also allows a user to pick and choose amongst favorite images in the event the user become bored with one particular photo saved on the system (e.g. choosing in similar fashion to a person choosing amongst CD tracks in a music CD). This preferably involves maintaining the reduced image un-chosen photos still available or a full image scrolling means such as full screen touching to go through the photos P1-P8 in equaling sequence starting with the photo next in line with the one presented and being replaced on the screen. Alternatively, processor generated random selection means is associated with the switch over means for randomly choosing from a set of images or stored library of images upon switchover activation or on a time based system. The images P1 to P8 are preferably aligned with touch screen buttons for direct choosing by pressing an image so that direct pressing activates the switchover process and places the pressed image in full screen mode. For non-touch screen systems there is provided, for example, means for highlighting one amongst the group such as by changing appearance (lighting level) or by changing border thickness or color for example with a choice activation system. Once an image is highlighted means for conversion of the reduced image to a full screen image is activated such as by way of the pressing of another button to trigger the processor into carrying out the full screen replacement.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention.

What is claimed is:

1. A vehicle navigation system with a multi-use display, comprising:
   navigation data supply means for supplying navigation data;
   non-navigation data supply means for supplying non-navigation data;
   image display means for displaying one or both of a navigation image display and a non-navigation image display, derived, respectively, from said navigation data and said non-navigation data; and
   switchover means for automatic selection amongst a navigation mode and a non-navigation mode, with said navigation mode providing for a display of said navigation data on said display means and said non-navigation mode providing for a display of said non-navigation data on said display means, and wherein said automatic selection by said switchover means is carried out based on a necessity level review for presenting navigation data for display by said display means.

2. The vehicle navigation system according to claim 1, further comprising:
   a communication port for inputting from an external resource non-navigation data to said non-navigation data supply means.

3. The vehicle navigation system according to claim 2, wherein
   said communication port is a physical connector port and arranged in a front face housing of said display means.

4. The vehicle navigation system according to claim 2, wherein
   said communication port is a physical connector port and arranged in a support structure which supports said display means.

5. The vehicle navigation system according to claim 2, wherein
   said communication port is a wireless communication port.

6. The vehicle navigation system according to claim 1, wherein
   the vehicle navigation system is installed in a vehicle, and said display means is mounted on a dashboard of the vehicle.

7. The vehicle navigation system according to claim 1 wherein
   said switchover means further comprises a toggle type manual mode selector for switching back and forth between said navigation mode and said non-navigation mode.

8. The vehicle navigation system according to claim 1, wherein
   said switchover means further comprises a touch screen manual trigger mode selector for triggering a switching in modes presented by said display means.

9. The vehicle navigation system according to claim 1, wherein
   said display means displays the navigation data while the system is in said navigation mode together with the non-navigation data displayed as a reduced in size image relative to the navigation data display.

10. The vehicle navigation system according to claim 1 wherein
said switchover means automatically converts said navigation mode to said non-navigation mode upon determination in said necessity level review of a non-necessity for presenting navigation data.

11. The vehicle navigation system according to claim 10, wherein
said switchover means determines said non-necessity in a case where an estimated time to a next potential navigation point is larger than a preset time.

12. The vehicle navigation system according to claim 10, wherein
the switchover means determines said non-necessity in a case where an estimated distance to a next potential navigation point is larger than a preset distance.

13. The vehicle navigation system according to claim 10, wherein
said switchover means changes from said non-navigation mode back to said navigation image mode upon a determination in said necessity level review of a necessity for presenting navigation data.

14. The vehicle navigation system according to claim 1, wherein
said non-navigation data includes photo or picture image data.

15. The vehicle navigation system according to claim 1 wherein said switchover means automatically selects said navigation mode upon a determination in said necessity level review that there is a necessity for presenting navigation data.

16. The vehicle navigation system according to claim 15, wherein
said switchover means determines said necessity in the case where an estimated distance to a next potential navigation point is smaller than a preset distance.

17. The vehicle navigation system according to claim 16, wherein
said preset distance is set larger as a current vehicle speed or an average vehicle speed over an earlier period of time is larger.

18. The vehicle navigation system according to claim 15, wherein
said switchover means determines said necessity in the case where an estimated time to a next potential navigation point is smaller than a preset time.

19. The vehicle navigation system according to claim 18, wherein
said preset time is set larger as a current vehicle speed or an average vehicle speed over an earlier period of time is larger.

20. The vehicle navigation system according to claim 15 wherein
said switchover means determines said necessity when a potential vehicle control problem is detected.

21. The vehicle navigation system according to claim 20 wherein
said navigation data display on said display means includes a vehicle service direction mapping.

* * * * *